(12) United States Patent
Waffner et al.

(10) Patent No.: US 11,225,159 B2
(45) Date of Patent: Jan. 18, 2022

(54) CHARGING STATION AND METHOD OF INSTALLING A CHARGING STATION

(71) Applicants: Jürgen Waffner, Essen (DE); Jörg Meier, Serrig (DE)

(72) Inventors: Jürgen Waffner, Essen (DE); Jörg Meier, Serrig (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/793,906

(22) Filed: Feb. 18, 2020

(65) Prior Publication Data

US 2020/0180457 A1 Jun. 11, 2020

Related U.S. Application Data

(63) Continuation of application No. PCT/EP2018/060156, filed on Apr. 20, 2018.

(30) Foreign Application Priority Data

Aug. 18, 2017 (DE) .................... 10 2017 118 916.5

(51) Int. Cl.
*B60L 53/31* (2019.01)
*B60L 53/302* (2019.01)

(52) U.S. Cl.
CPC ............. *B60L 53/31* (2019.02); *B60L 53/302* (2019.02)

(58) Field of Classification Search
CPC ....................................................... B60L 53/31
See application file for complete search history.

(56) References Cited

U.S. PATENT DOCUMENTS

| | | | | |
|---|---|---|---|---|
| 612,052 | A * | 10/1898 | McMullen | E04H 12/2215 52/154 |
| 2,040,010 | A * | 5/1936 | Mcmahon | E04H 12/2292 52/127.2 |
| 6,204,446 | B1 * | 3/2001 | Parduhn | E04H 12/003 174/45 R |

(Continued)

FOREIGN PATENT DOCUMENTS

| CN | 102616215 A | * | 8/2012 | ................ B60S 5/00 |
|---|---|---|---|---|
| CN | 102616215 B | | 2/2016 | |

(Continued)

OTHER PUBLICATIONS

CN102616215A description translation (Year: 2012).*
DE 102010027050 description translation (Year: 2012).*
EP2993748A1 description translation (Year: 2016).*

*Primary Examiner* — Drew A Dunn
*Assistant Examiner* — Tynese V McDaniel
(74) *Attorney, Agent, or Firm* — Reinhart Boerner Van Deuren P.C.

(57) ABSTRACT

Embodiments of the disclosure relate to a charging station for electric vehicles with a ground foundation and a column arranged above the ground foundation and accommodating charging electronics. The ground foundation and the column are formed in one piece. The column includes an opening which runs transversely to the longitudinal axis of the column and extends into the interior of the column. The opening is arranged for accommodating a charging electronics, in particular the opening is arranged as receptacle for the charging electronics and comprises locking means for the charging electronics.

13 Claims, 4 Drawing Sheets

(56) References Cited

U.S. PATENT DOCUMENTS

| | | | |
|---|---|---|---|
| 2003/0120442 A1* | 6/2003 | Pellegrino | G07F 15/005 |
| | | | 702/60 |
| 2010/0013434 A1* | 1/2010 | Taylor-Haw | G06Q 20/18 |
| | | | 320/109 |
| 2011/0145141 A1* | 6/2011 | Blain | B60L 53/16 |
| | | | 705/39 |
| 2011/0246014 A1* | 10/2011 | Sauper | B60L 53/31 |
| | | | 701/22 |
| 2012/0043935 A1* | 2/2012 | Dyer | B60L 53/665 |
| | | | 320/109 |
| 2013/0015816 A1* | 1/2013 | Bianco | B60L 11/1818 |
| | | | 320/109 |
| 2013/0169227 A1* | 7/2013 | Tremblay | B60L 53/11 |
| | | | 320/109 |
| 2014/0009112 A1* | 1/2014 | Fontana | B60L 53/65 |
| | | | 320/109 |
| 2017/0129356 A1* | 5/2017 | Johnson | B60L 11/1825 |
| 2018/0257501 A1* | 9/2018 | Hahre | B60L 11/1825 |
| 2020/0189412 A1* | 6/2020 | Rauma | F21S 8/085 |

FOREIGN PATENT DOCUMENTS

| | | | | |
|---|---|---|---|---|
| DE | 8808772 U1 | 11/1988 | | |
| DE | 2012-A92078 | * 7/2010 | | |
| DE | 10 2009 024721 A1 | 12/2010 | | |
| DE | 10 2010 027050 A1 | 1/2012 | | |
| EP | 2993748 | * 9/2014 | | H02G 3/04 |
| EP | 2993748 A1 | 3/2016 | | |

* cited by examiner

CHARGING STATION AND METHOD OF INSTALLING A CHARGING STATION

CROSS-REFERENCE TO RELATED PATENT APPLICATIONS

This patent application is a continuation of PCT/EP2018/060156, filed Apr. 20, 2018, which claims priority to German Application No. 10 2017 118 916.5, filed Aug. 18, 2017, the entire teachings and disclosure of which are incorporated herein by reference thereto.

FIELD

The subject matter relates to a charging station as well as a method for installing a charging station.

BACKGROUND

The expansion of the charging infrastructure is of crucial importance for the acceptance of electromobility. The expansion leads to an increased availability, especially in public and semi-public spaces.

However, the expansion of the charging infrastructure in particular involves considerable investments for the infrastructure operator. In particular, the installation of the charging station alone nowadays involves a wide range of different trades. Initially, the distribution system operator (DSO) has to lay a ground cable to the planned installation site of the charging station. Up to now, a qualified electrician (HAK) establishes the mains connection at the house junction box. Then a civil engineer excavates the ground and installs the ground foundation. Afterwards, the charging station is placed on the ground foundation by the operator of the charging station. Finally, the installation of the charging electronics is carried out by a technician of the charging station operator.

These many trades not only lead to an extended assembly process duration, but also to increased costs and a considerable organizational effort.

Therefore the subject-matter was based on the object of simplifying the installation of charging stations.

BRIEF SUMMARY

This object is solved by a charging station and a method as described herein.

It has been found that the distribution system operator is able to install the charging station independently up to the mains connection fuse. According to the subject matter it is now proposed that the charging station is installed in one piece by installing not only the ground foundation but also the charging station column, which is arranged for accommodating the charging electronics, simultaneously in a single assembly. For this purpose, the charging station is provided in one piece comprising the ground foundation and the column and is inserted directly into the excavation at the installation site. Afterwards, the distribution system operator, who has also laid the ground cable, can install the charging station placed in this way electrically up to the mains connection fuse, backfill the shaft and make the charging station electrically available for commissioning. Afterwards it is only necessary to insert the charging electronics into the charging station and the charging station is ready for operation.

It is proposed that a mains connection fuse is arranged in the column. In particular, a mains connection fuse is arranged in a separate housing (HAK) in the column. The ground cable is directly connected to this mains connection fuse by laying it through the ground foundation and the column to the fuse. The distribution system operator can carry out these installation works.

The column is preferably provided with an opening running transversely to the longitudinal axis of the column. The opening can also run in parallel to at least one of the side walls of the column. The opening extends into the interior of the column. Thus an opening is provided which forms a receptacle for a charging electronics on the outer skin of the column. The opening can be formed as a through-opening. In the middle of the opening, i.e. in the middle of the outer walls limiting the opening, the mains connection fuse can be provided, for example in its own housing. On both sides of the housing of the mains connection fuse, contacts can be provided which can be connected to a charging electronics. It is also possible that the opening only penetrates one outer wall of the charging column and thereby only one receptacle for a charging electronics is provided. The opening is preferably closed off by walls from the inside of the column. The ground cable can be led through a wall.

The opening thus serves to accommodate a mains connection fuse and/or a house connection box. The electrical responsibility of the distribution system operator ends at the mains connection fuse or the house junction box. There, the necessary fuses are provided to protect the mains against the load. The mains connection fuse or the house connection box can be arranged in a separate housing within the opening. Electrical and, if necessary, mechanical contacts can be provided on the housing arranged there to accommodate a charging electronics preferably enclosed in a housing. It is conceivable that the charging electronics, including measuring equipment, and/or power circuit, and/or charging cable socket, and/or communication technology and/or the like is enclosed in a single housing. On this housing, electrical contacts may be provided on a rear wall which correspond to the contacts of the house connection box or the housing of the mains connection fuse. A charging electronics arranged in this way can be installed as a whole in the charging station or the opening. To this end, it is not even necessary that an electrician installs the charging electronics. Rather, it is possible to provide the charging electronics preassembled in the housing. It is only necessary to insert the charging electronics with the housing into the corresponding receptacle of the column of the charging station and the charging station is ready for operation.

As already explained, the opening can penetrate two outer walls of the column. Each opening can be arranged as a receptacle for a housing of a charging electronics. It is thereby possible to insert charging electronics into the charging column on both sides of the house connection box or housing of the mains connection fuse and to connect it electrically to the distribution network.

According to an embodiment, it is proposed that the opening is arranged as a receptacle for a charging electronics. In particular, connection contacts for the charging electronics can be arranged in the opening. These connection contacts are preferably arranged on the outside of a housing which surrounds the mains connection fuse. The contacts can be formed as plug contacts.

For mounting the charging electronics, locking means can be provided at the opening that mechanically lock the charging electronics in the opening. This can be made possible, for example, by snap locks or similar.

It has been found that the main technology for controlling the charging electronics and/or charging column (e.g., control circuit, user interface, input/output means, sensors, processor, memory, to name a few non-limiting examples) can be built into a basic body of the charging electronics (also called charging box unit). For example, a keyboard or the like may be provided as input means. For example, a display or the like may be provided as an output means so that an interaction with an owner or user of an electric vehicle is possible. A combined input/output interface is also conceivable, for example a touch-sensitive display, which can both display information and receive input from the owner or user.

A charging electronics thus comprises the entire electrical and information and communication technology (ICT) elements, depending on the characteristics of the equipment. For example, charging electronics can provide the control options necessary for operating the charging column and/or provide extended functions for a control and/or regulation of the charging column. For example, status information or the like can also be provided to an owner or user, e.g., by means of a display device of the charging electronics.

The charging electronics comprises a plug connection (e.g., a plug) at the rear, via which the charging electronics can receive all necessary incoming and/or outgoing leads from the charging column. The charging column comprises a plug connection (e.g., a socket) corresponding to the plug connection of the charging electronics. In particular, input information and output information can be exchanged via the connection between the charging electronics and the charging column which can be established by means of the plug connections. Input information can comprise, for example, control inputs from the owner or user of the electric vehicle. Furthermore, input information can represent, for example, charging preferences of the owner or user of the electric vehicle. Input information can be entered by an owner or user of an electric vehicle, for example, via a user interface, and can be captured accordingly. Output information may comprise, for example, information relating to a charging process, and/or query information for the regulation or control of a charging process. Output information may, for example, be output by means of a display device comprised by the charging electronics.

It is proposed that the charging electronics include a fixing element so that the charging electronics is fixed in the opening when in the mounted state. The charging electronics may, for example, be fixed or locked in the opening by means of the fixing element in the mounted state. The fixing element can, for example, be a protrusion/recess surrounding the plug connection of the charging electronics, which the base body, for example, has (e.g., on the rear of the base body). The projection (tongue)/recess (groove) can, for example, connect with a corresponding recess/projection on the opening when the device is in the mounted state. Alternatively or additionally, the fixing element can be enclosed by the housing of the charging electronics, for example. For example, the fixing element can be arranged on one of the side faces of the housing of the charging electronics.

Furthermore, snap-in elements such as clips can be used as fixing elements. These can, for example, snap into corresponding counterparts and fix the charging electronics to the charging column. Manually operated fixing elements are also conceivable, such as a fixing by means of a screw or a clamping element. The fixing element ensures that the charging electronics is fixed or locked in the receptacle of the charging column when mounted. Such a fixing element can, for example, be arranged on the rear of the base body. Alternatively or additionally, the fixing element can be arranged on the housing which at least partially encloses the base body. In particular, the fixing element can be provided on a side face of the housing. In one embodiment, the opening of the charging column in the mounted state at least partially encloses the side face of the housing of the charging electronics. Several fixing elements may be comprised by the charging electronics.

According to one embodiment, it is proposed that an anti-theft device is provided so that a charging electronics mounted in the opening of the charging column cannot be detached from the outside anymore. This is particularly recommended when arranging charging electronics on charging columns that are publicly accessible.

It is further proposed that the anti-theft device should comprise a snap-in element which is accessible from an inside face of the charging point and which, when actuated, enables the charging electronics to be detached from the opening of the charging column.

The anti-theft device has the effect, for example, that after mounting the charging electronics on the charging column, the charging electronics cannot be detached from the outside anymore. It is therefore no longer possible to simply pull the charging electronics off the charging column from the outside. In order to enable the replacement of a charging electronics mounted in the charging column, the anti-theft device can be unlockable, for example, as explained above. For example, this can be done by means of a suitable adapter or the like, which, for example, is inserted into an opening provided for unlocking the anti-theft device.

According to an embodiment, it is proposed that the charging electronics can be fixed to the charging column in the mounted state by means of the plug connection.

Alternatively, the charging electronics is fixed to the charging column in the mounted state by means of the plug connection. For this purpose, the plug connection (e.g., on the side of the charging electronics and/or on the side of the charging column) can have a snap-in element (e.g., a clamping element, a hook-like element or the like). The snap-in element snaps into a correspondingly formed counterpart when the plug connection is connected by mounting the charging electronics in the opening of the charging column, so that the charging electronics is or can be fixed to the charging column by means of the plug connection.

In order to secure the charging station in the incompletely installed state, it is necessary to provide touch protection on the contacts for the charging electronics. This can be provided by unlocking means, for example. The unlocking means can electrically disconnect the mains connection fuse from the contacts. When the charging electronics is inserted, a mechanical connection of the mains connection fuse to the contacts can, by means of a suitable mechanism of the unlocking means, only be made when the charging electronics is inserted completely into the opening or to a minimum depth. This means that when the charging electronics is placed in the opening, the electrical connection between the mains connection fuse and the charging electronics is unlocked.

In order to make the installation of the charging station as easy as possible for the distribution system operators, it is proposed that a cable duct extends from an outer wall of the ground foundation through the ground foundation to at least parts of the column, in particular to the opening of the column. An outer wall of the ground foundation is in particular a side wall or a bottom of the ground foundation. Starting from here, the cable duct may extend through the ground foundation up into the column. In the column, the cable duct can extend in particular up to the opening in which the mains connection fuse or the house connection box is arranged. Then, when the charging station is set down into the shaft, the ground cable lying there can be led directly through the cable duct to the opening where it can be electrically connected to at least one mains connection fuse immediately. This work can be carried out by the distribution system operator, so that the charging station can be installed in a single trade.

In particular, the column and the ground foundation are made of a solid material. The column and the ground foundation can preferably be made of concrete. In particular this can be a concrete casting. Such a concrete casting is particularly robust against vandalism. In order to avoid weathering of the concrete casting, it is possible that a cover can be put over the column. The cover can be made of a plastic part, in particular an injection moulding, can have an inner profile that corresponds to the outer profile of the column.

It is also possible that the ground foundation and the column are made of an injection-moulded part, especially of plastic. In this case, the column and the ground foundation are hollow. It is proposed that the ground foundation has a hollow housing and/or that the column has a hollow housing. Both the ground foundation and the column can be formed as a housing, which is hollow. This results in a significantly lower weight compared to a solid component, especially a concrete casting.

In order to be able to insert a concrete casting particularly easily into the shaft, it is also proposed that at least one hook is provided at the top of the column or at the outer wall of the ground foundation facing the column, which is connected to the material of the column or the ground foundation. This hook can be used to lift the charging station into the shaft by means of a crane. In particular, a hook on the upper part can be arranged in a recess so that it does not protrude from the profile of the charging station or the column.

As already explained, a cable bushing can be arranged in the housing. If, after the housing, which is preferably hollow, has been inserted into the shaft, the housing of the ground foundation is filled, it is preferable that the cable bushing is sealed against the inside of the housing. In particular, a sealing against the interior of the housing of the ground foundation is preferred. The housing of the ground foundation can also be sealed against the housing of the column. Only the cable bushing can be routed inside the housing of the ground foundation.

After placing the charging station into the shaft, it may be necessary to secure it against tipping over. This is achieved by weighting down the ground foundation. Especially by filling the housing with pourable material, such as sand, water or similar, the housing of the ground foundation can be weighted down. This makes the ground foundation heavier and the charging station has a secure standing. For filling, an upward pointing, closable opening is provided for receiving filling material into the ground foundation. This opening is preferably on the outer wall that is facing the column.

Especially at high charging powers, for example a charging power of more than 100 kW, especially more than 200 kW, for example up to 350 kW, heat is generated in the charging station, which can no longer be dissipated by simple convection, but for which a cooling circuit is necessary. Such a cooling circuit can, for example, be operated with coolant, for example water. The liquid can be stored in the hollow space of the ground foundation. A pump in the ground foundation or in the column can provide circulation of the cooling liquid.

As already explained, the charging station according to the subject matter is particularly easy to install. To this end, first of all a ground foundation with a column has to be made in one piece and then this ground foundation, together with the column, can be placed into a foundation shaft. Only one installation step is necessary and the charging station is mechanically installed.

Afterwards, a ground cable can be laid through a cable duct that extends through the ground foundation to at least parts of the column.

BRIEF DESCRIPTION OF THE DRAWING

In the following, the subject matter is explained in more detail by means of a drawing showing embodiments. In the drawing.

DETAILED DESCRIPTION

Figure 1:
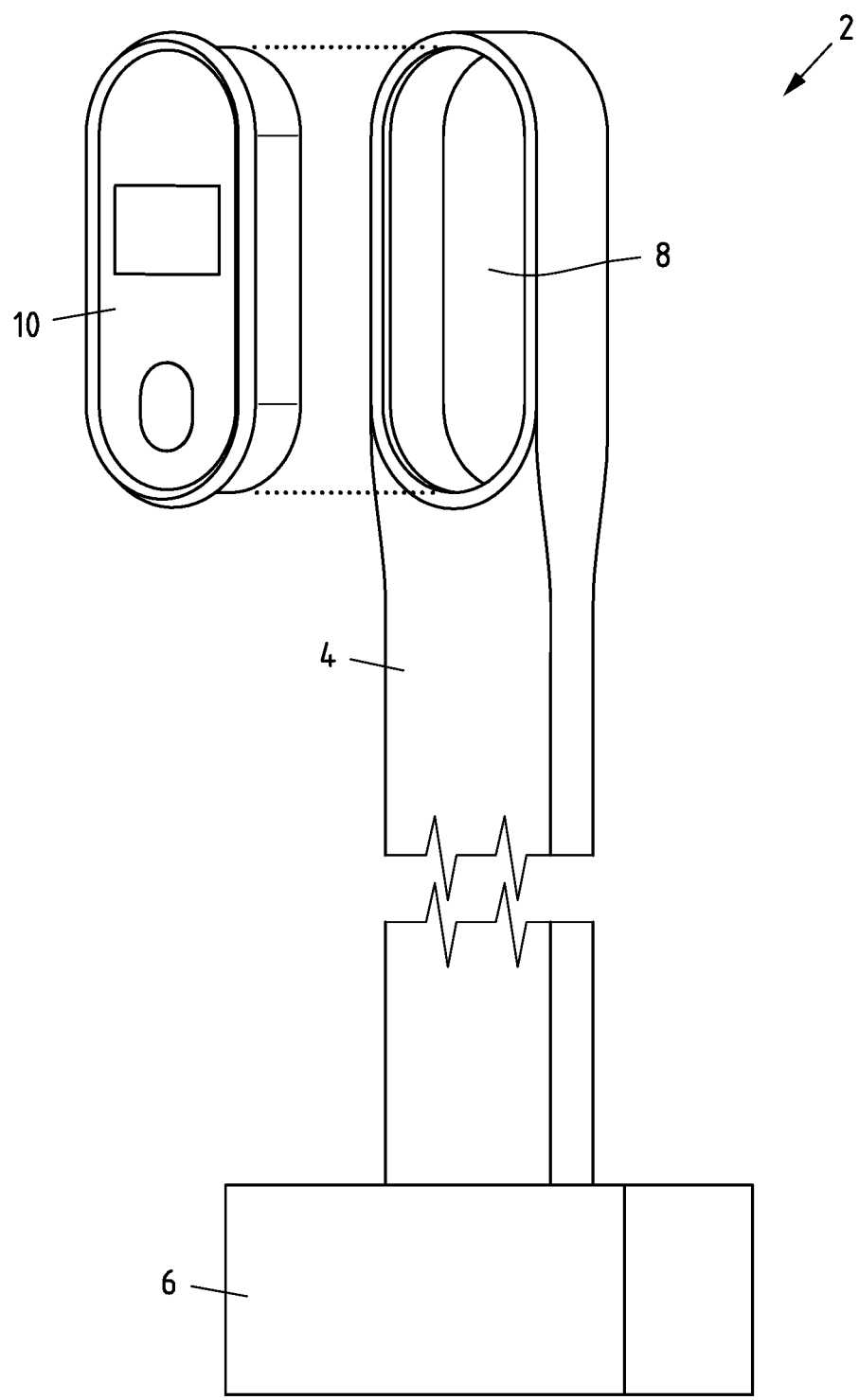
FIG. 1 shows a view of an example charging station.

FIG. 1 shows a charging station 2 with a charging column 4 and a ground foundation 6. In the charging column 4 at the upper part, an opening 8 is provided as a receptacle for a charging electronics 10.

The charging column 4 and the ground foundation 6 are preferably formed contemporaneously in one unitary piece within a single assembly. This makes it possible to insert the charging station into a shaft and to establish an immediate electrical connection between a distribution network and a mains connection fuse in a single installation step. The mains connection fuse is preferably provided in opening 4 in a housing provided for this purpose, for example a house connection box.

After installation of the charging station 2, it is firmly anchored in the ground with the ground foundation 6. It is now only necessary to insert the charging electronics 10 into the opening 8. In this context, it should be noted that the charging station 2 only comprises the charging column 4 and the ground foundation 6 and, if necessary, a connection cable routed therein to a distribution network, in particular a local network. All charging electronics, in particular measuring electronics, charging control and the like are comprised by the charging electronics 10. The charging station 2 is only ready for operation with plugged-in charging electronics 10.

Figure 2:
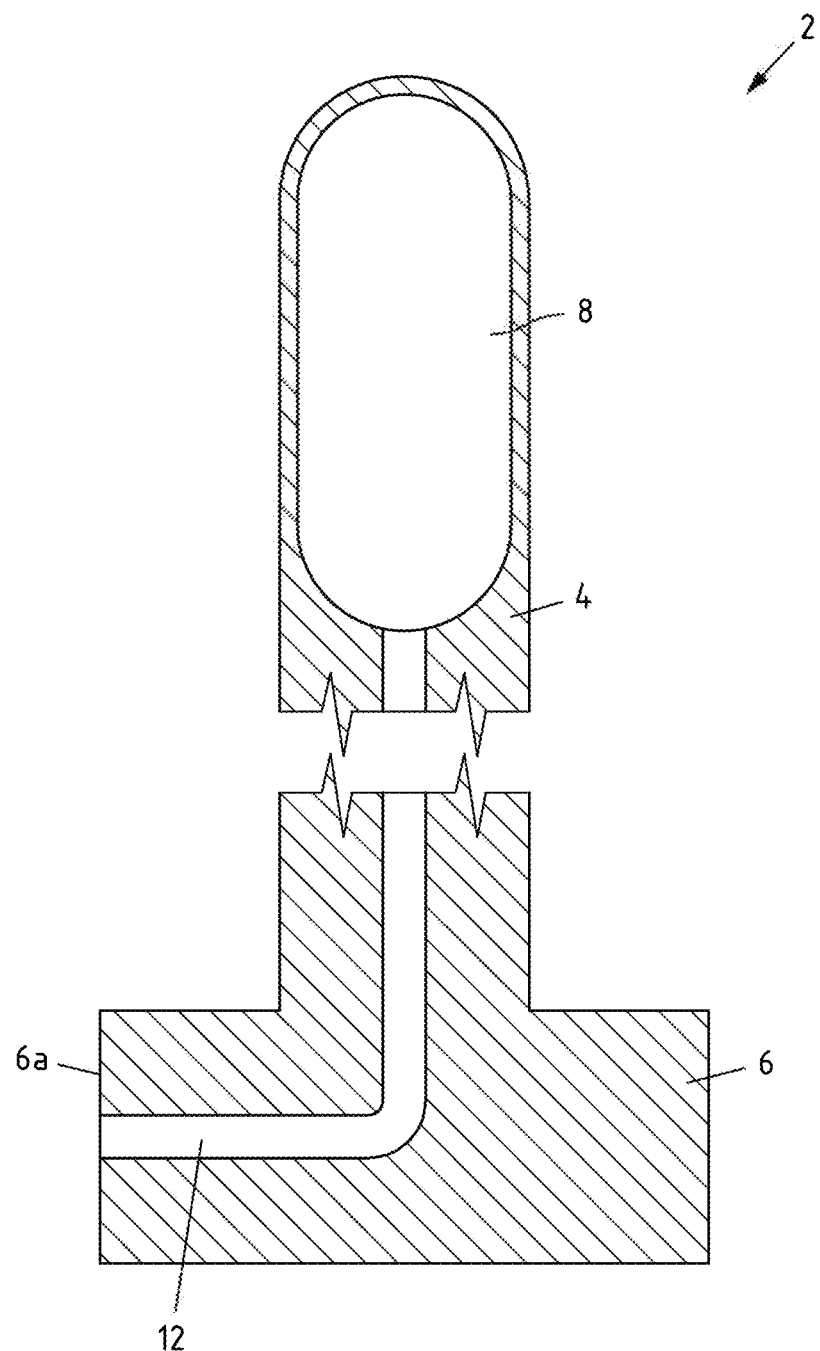
FIG. 2 shows a sectional view of an example charging station.

The charging station 2 can be made of a solid material. FIG. 2 shows a section through a charging station 2 made of a solid material. In particular this can be a concrete casting. It can be seen that the charging column 4 is formed in one piece with the ground foundation 6.

A cable duct 12 runs inside the ground foundation 6 and at least in parts in the column 4. A cable can be laid through the cable duct 12 from a side wall 6a of the ground foundation 6 through the ground foundation 6 and at least in parts of the column 4. The cable duct 12 ends in the opening 8.

Figure 3:
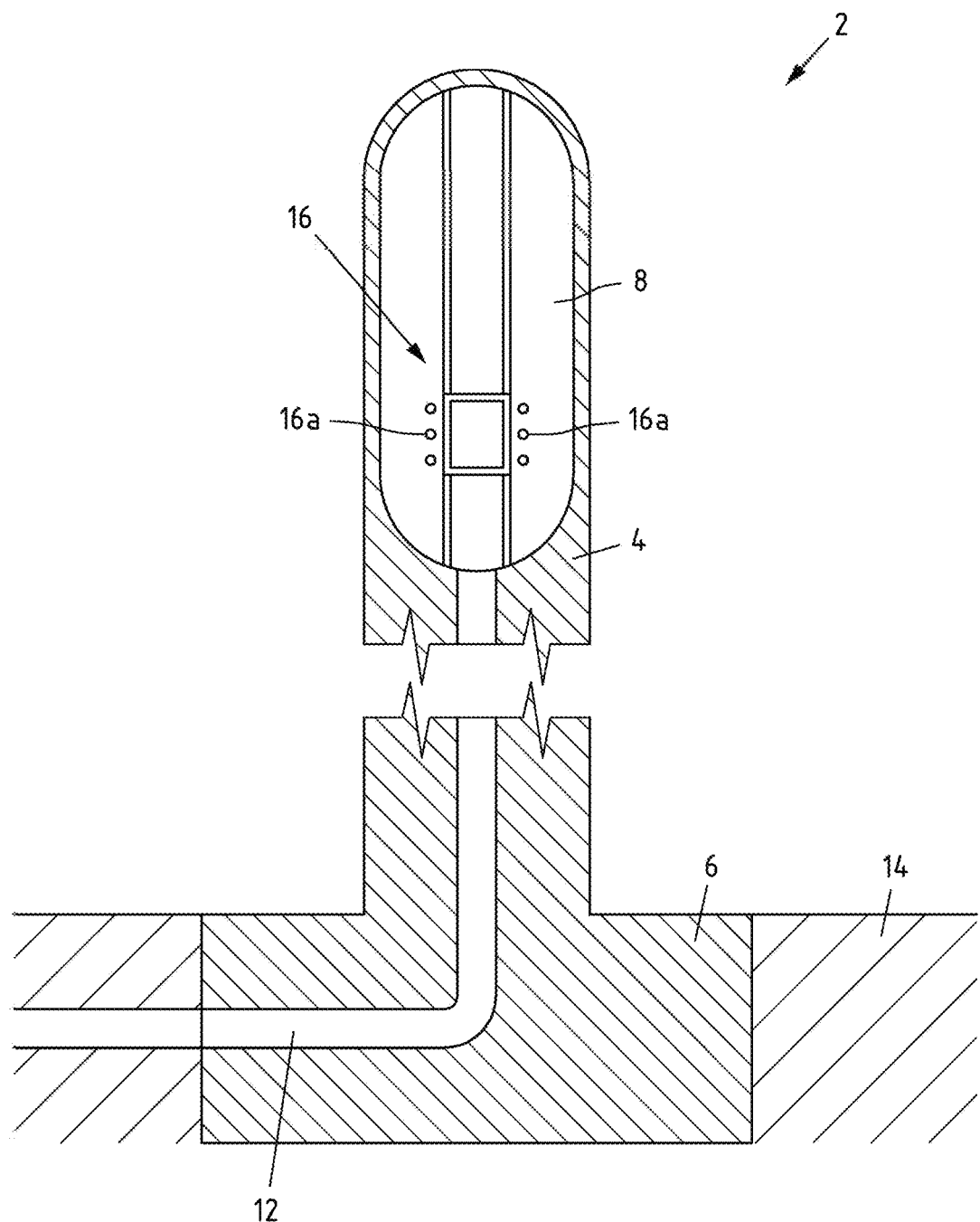
FIG. 3 shows another sectional view of an example charging station.

FIG. 3 shows the charging station 2 in a mounted state. It can be seen that the ground foundation 6 is installed in the ground 14. Furthermore, a fuse box 16, in particular a house connection box, is arranged in the opening 8 of column 4. It can be seen that the fuse box 16 is located centrally in the opening 8 with an equal distance to the outer walls of the charging column 4. Contact pins 16a can be provided on the outer walls of the fuse box 16, which interact with contacts of the charging electronics 10. When inserting the charging electronics 10 into the opening 8, the contact pins 16a can come into electrical contact with the charging electronics 10.

A ground cable can be laid through the cable duct 12 from the ground 14 to the fuse box 16. In the fuse box 16, strain reliefs can be provided. In the fuse box 16 a mains connection fuse is provided to which the earth cable is connected. The mains connection fuse is electrically connected to the contacts 16a. After installing the mains connection fuses, the charging station 2 is inasmuch ready for operation as that only the charging electronics 10 has to be plugged into the opening 8.

Figure 4:
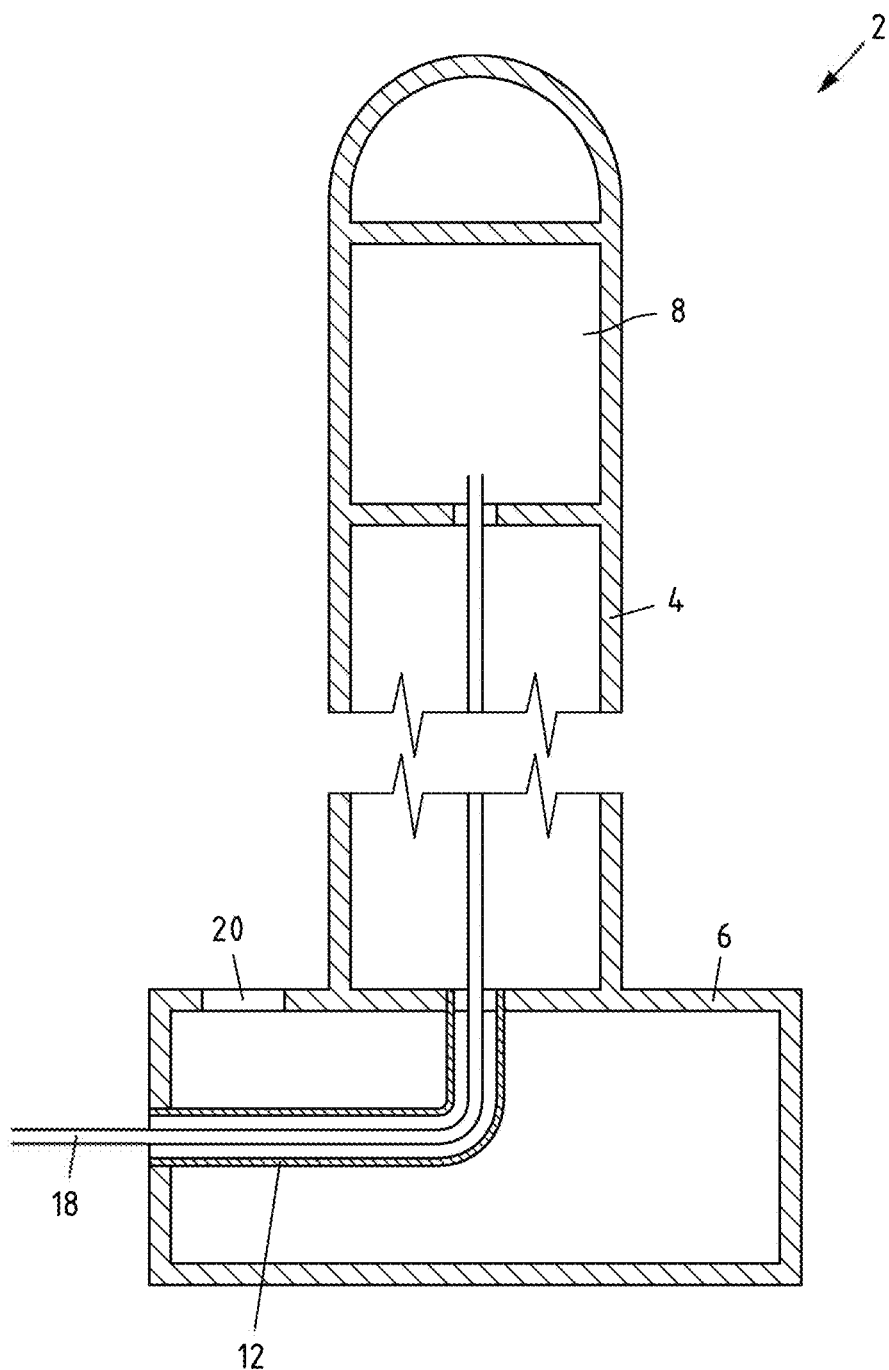
FIG. 4 shows another sectional view of an example charging station.

FIG. 4 shows a further embodiment in which the charging station 2 is no longer made of solid material, but in which the charging column 4 and the ground foundation 6 are each formed as a hollow housing. The cable duct 12 is preferably led through the housing of the ground foundation 6 in a waterproof way. The interior of the housing of the ground foundation 6 is sealed against the interior of the housing of the column 4. In this way it is ensured that no material from the housing of the ground foundation 6 enters the housing of the column 4. A ground cable 18 can be laid through the cable duct 12 and the interior of the housing of the charging column 4 to the opening 8.

A closable opening 20 can be provided at the top of the housing of the ground foundation 6, through which filling material can be filled into the housing of the ground foundation 6. This can for example be a pourable material, especially a liquid material, for example water. After installation of the charging station 2 in the shaft, for example water can be filled into the ground foundation 6 through the opening 20, thus weighting down the charging station 2.

If for example water or another coolant is stored in the housing of the ground foundation 6, then this can also be used as a coolant for the charging electronics 10. For this purpose, for example a pump can be provided in the ground foundation 6 or the charging column 4 by which the liquid can be pumped from the ground foundation into areas of the charging column 4, in particular into the area of the charging electronics 10.

REFERENCE SIGNS 2 charging station
4 charging column
6 ground foundation
6a side wall
8 opening
10 charging electronics
12 cable duct
14 ground
16 fuse box
16a contacts
18 ground cable
20 opening All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A charging station for electric vehicles, comprising:
   a ground foundation; and
   a column arranged above the ground foundation;
   wherein the ground foundation and the column are contemporaneously formed in one unitary piece within a single assembly;
   wherein the column comprises an opening which runs transversely to the longitudinal axis of the column and extends into the interior of the column, the opening being arranged for accommodating a charging electronics; and
   wherein the opening is arranged as receptacle for the charging electronics and comprises locking means for the charging electronics.

2. The charging station according to claim 1, wherein a mains connection fuse is arranged in the column.

3. The charging station according to claim 1, wherein the opening is a through-opening.

4. The charging station according to claim 1, wherein the opening is formed to accommodate a mains connection fuse and/or a house connection box.

5. The charging station according to claim 1, wherein the opening penetrates two outer walls of the column.

6. The charging station according to claim 1, wherein connection contacts for the charging electronics are formed in the opening.

7. The charging station according to claim 1, wherein unlocking means are provided in the opening, in such a way that an electrical connection between a mains connection fuse and the charging electronics is only unlocked by the unlocking means when the charging electronics is arranged in the opening.

8. The charging station according to claim 1, wherein a cable duct extends from an outer wall of the ground foundation through the ground foundation into at least parts of the column, in particular up to the opening in the column.

9. The charging station according to claim 1, wherein the column and the ground foundation are made from concrete, in particular cast, and/or in that the ground foundation and the column are made from one injection-moulded part.

10. The charging station according to claim 1, wherein the ground foundation has a hollow housing and/or that the column has a hollow housing.

11. The charging station according to claim 1, wherein a cable bushing is formed in the ground foundation housing, the cable bushing being sealed in particular with respect to the interior of the ground foundation housing.

12. The charging station according to claim 1, wherein the ground foundation has a closable opening pointing upwards in the installed state for receiving filling material.

13. The charging station according to claim 1, wherein a coolant is stored in the ground foundation and wherein the coolant can be transported from the ground foundation into the column.

\* \* \* \* \*